(12) United States Patent
Reeve et al.

(10) Patent No.: US 12,088,726 B2
(45) Date of Patent: Sep. 10, 2024

(54) SYSTEMS AND METHODS FOR PREDICTING COMMUNICATION ACCOUNT IDENTITIES ACROSS DECENTRALIZED APPLICATIONS

(71) Applicant: Coinbase, Inc., Oakland, CA (US)

(72) Inventors: Alex Reeve, San Francisco, CA (US); Harrison Dahme, Stateline, NV (US); Leo Chen, New York, NY (US); Akash Shah, Oakland, CA (US); Ming Jiang, Foster City, CA (US); Sid Shekhar, London (GB); Zhicong Liang, Bellevue, WA (US)

(73) Assignee: Coinbase, Inc., Oakland, CA (US)

( * ) Notice: Subject to any disclaimer, the term of this patent is extended or adjusted under 35 U.S.C. 154(b) by 317 days.

(21) Appl. No.: 17/735,157

(22) Filed: May 3, 2022

(65) Prior Publication Data

US 2023/0362010 A1    Nov. 9, 2023

(51) Int. Cl.
*H04L 9/32* (2006.01)
*G06N 20/20* (2019.01)
*H04L 9/00* (2022.01)

(52) U.S. Cl.
CPC .......... *H04L 9/3236* (2013.01); *G06N 20/20* (2019.01); *H04L 9/50* (2022.05)

(58) Field of Classification Search
CPC .................. H04L 9/3236; H04L 9/50
See application file for complete search history.

(56) References Cited

U.S. PATENT DOCUMENTS

| | | | |
|---|---|---|---|
| 11,538,029 B2 * | 12/2022 | Young | G06F 18/2431 |
| 11,854,101 B1 * | 12/2023 | Nazarov | G06Q 50/18 |
| 11,961,136 B2 * | 4/2024 | Cabrera | G06Q 20/381 |
| 2017/0295023 A1 * | 10/2017 | Madhavan | G06F 21/40 |
| 2019/0132350 A1 * | 5/2019 | Smith | G06F 21/60 |
| 2020/0058023 A1 * | 2/2020 | Travizano | H04L 9/3239 |
| 2021/0119785 A1 * | 4/2021 | Ben-Reuven | H04L 9/3239 |
| 2021/0248536 A1 * | 8/2021 | Sheikh | G06Q 20/0855 |
| 2022/0067715 A1 * | 3/2022 | Deng | G06Q 20/3827 |
| 2023/0103398 A1 * | 4/2023 | Vosseller | G06Q 20/367 |
| | | | 705/26.1 |
| 2023/0135294 A1 * | 5/2023 | Vosseller | G06Q 20/401 |
| | | | 705/75 |
| 2023/0298005 A1 * | 9/2023 | Saad | G06Q 20/4016 |
| | | | 705/65 |

\* cited by examiner

*Primary Examiner* — Hieu T Hoang
(74) *Attorney, Agent, or Firm* — Foley & Lardner LLP (57) ABSTRACT

Methods and systems that use of a multi-tiered machine learning architecture that aggregates traits of blockchain and off-chain operations. The multi-tiered machine learning architecture then uses this data to generate recommendations related to account identities for communications (e.g., blockchain operations) that occur across decentralized applications.

20 Claims, 6 Drawing Sheets

SYSTEMS AND METHODS FOR PREDICTING COMMUNICATION ACCOUNT IDENTITIES ACROSS DECENTRALIZED APPLICATIONS

BACKGROUND

In recent years, the use of blockchains and blockchain technology has exponentially increased. A blockchain comprises a list of records, called "blocks," that are "chained" together using cryptography. Each block may comprise data that is computed using a one-way function (e.g., a function that is practically impossible to invert or reverse-compute) of a previous block, a timestamp (e.g., indicating a creation and/or modification time), and additional data (e.g., transactional or operational data related to blockchain operations).

While publicity for blockchains and blockchain technology has been concentrated on its use for cryptocurrencies and smart contracts, blockchains and blockchain technology may be applicable to numerous technological avenues. A common theme of the technological avenues is the manner in which blockchains and blockchain technology are decentralized such that facilitation, management, and/or verification of blockchain-based operations is governed or administered not by any one authority but instead by a community of users. The blockchain may therefore remain distributed (e.g., on a network of computers that communicate and coordinate their actions by passing messages to one another), and in many cases public, through a digital ledger, which records the series of blocks forming the chain. Notably, because each block depends on a preceding block, edits to existing blocks in the chain may not be made without affecting subsequent blocks.

Furthermore, updates to the blockchain (e.g., the addition of new blocks) may include incentivization systems that reward community members for the generation of the updates while also ensuring a consensus by the community. By doing so, the proliferation of the blockchain may proceed indefinitely.

SUMMARY

However, as blockchain-based operations are not governed or administered by any one authority, blockchain-based operations are inherently more private than off-chain operations. That is, in blockchain-based operations, users are identified by a wallet address, but are otherwise unidentifiable. While the enhanced privacy is helpful or desired in some instances, the lack of transparency also creates hurdles to implementing ecosystems that rely on trust between users. Methods and systems are described herein for novel uses and/or improvements to blockchains and blockchain technology. As one example, methods and systems are described herein for providing an identity platform that may be used in decentralized applications and/or in conjunction with blockchain operations.

For example, conventional blockchain systems are built in "trustless" environments. That is, no user in the blockchain network is required to trust another. Instead, the blockchain technology itself (e.g., the cryptography algorithms, the immutable nature of the blockchain, etc.) is designed to function without trust between participants. As such, no user in the blockchain network is required to identify themselves. This has led to the potential for blockchain technology to be abused by bad actors (e.g., users attempting to use blockchain technology to commit fraud, circumvent government regulations, etc.).

In view of this, the methods and systems described herein provide for a reputation oracle that decentralized applications may use in order to generate recommendations related to a risk score determination associated with a blockchain address, a KYC ("know-your-customer") or KYB ("know-your-buyer") assessment, a credit score or lending characteristic determination for a user, government rule or regulation compliance, etc.

To provide this functionality, the system must first overcome (or mitigate) the fundamental features of blockchain technology that allow for the lack of transparency. For example, any user may create a user account without providing identifying information. Furthermore, a single user may have numerous accounts and may continuously create more. Accordingly, the methods and systems described herein approach this problem in an unconventional way through the use of a multi-tiered machine learning architecture that aggregates traits of blockchain and off-chain operations. The multi-tiered machine learning architecture then uses this data to generate recommendations related to account identities for communications (e.g., blockchain operations) that occur across decentralized applications.

Specifically, as the exact identity of a user (or purpose of a blockchain operation) is unknown for any given communication, the system may instead determine a probability of the identity based on numerous factors at any given time. The system may then use these real-time probabilities to predict blockchain network conditions at any given time. These blockchain network conditions may then be used to determine a rule set for predicting an identity (or purpose) of a user for a given communication. For example, the methods and systems create a multi-tiered solution to overcoming the uncertainty in predicting communication settlement, in which a first tier predicts account identity traits based on on-chain and off-chain data, and a second tier provides a communication specific prediction of a user identity (or purpose) corresponding to the account identity traits.

This approach, however, raises its own technical challenges, as determining the probability of each trait or identity at any given time is difficult. This determination is made more difficult as each trait may bias or otherwise mask another trait (particularly for bad actors that are intentionally attempting to mask their identity). In order to overcome this novel technical challenge, the methods and systems independently determine a trait using an independent model. Furthermore, these models are specific to a given input type. For example, if a system correlated a blockchain account to specific off-chain accounts (e.g., a social media profile, a bank account, etc., for a known user), the known user may easily bypass such a system through the creation of a new account that is not linked to the specific off-chain accounts. Moreover, this failure to link the accounts may bias or mask other data (e.g., frequency of blockchain operations, amount of typical blockchain operations, device location, device identification, etc.) that would identify (or shed light on) an identity (or purpose) of a user.

By addressing each data type with its own independent model, which is itself based on its own feed of data, the methods and systems alleviate this bias in predictions. For example, a first model (e.g., processing on-chain data) may determine blockchain network conditions (e.g., a volume of pending communications as compared to a typical amount based on historic data). This information, which is determined independently of any user-specific prediction, is therefore not biased by any user-specific information, if available. Furthermore, by using independent models, the system may allow for an additional determination of how to determine an identity or purpose of a transaction based on the type (or amount) of data available.

However, this additional determination raises yet another technical challenge that is itself specific to blockchain technology, namely coordinating on-chain and off-chain data. For example, a fundamental problem with smart contracts is that they have limited ability to interact with data and systems existing outside their native blockchain environment. To overcome this technical challenge, the system uses an oracle layer (e.g., which may include one or more individual oracle components to prevent a single point of failure). For example, the system may use an oracle layer that compiles the on-chain and off-chain data to determine what rule set to apply to determine an identity of a user. The rule set that is selected may be based on the type (or amount) of information provided. For example, a bad actor attempting to circumvent government regulations may create a new blockchain account for one-time use. In such a scenario, little information may be available for determining the identity of a user for a communication. As such, the rule set applied for determining the identity (or purpose) of a communication may be different from one in which an ample amount of information is available. As an example, the system may more heavily weigh a user device location, amount of digital assets related to a blockchain operation, and/or age of the blockchain account. The system (and the rule set selected) may contrast this with a scenario in which a new blockchain account is created but there is additional data available (e.g., from a social media provider, back account, etc.). As an example, the system may not heavily weigh a user device location, amount of digital assets related to a blockchain operation, and/or age of the blockchain account. As separate models are used to determine traits based on the respective types of data, the lack of data does not affect an individual determination for a given trait, yet this information is still accounted for in the selection of the rule set used to generate the recommendation. Notably, this segregation of data and determinations also overcomes a technical hurdle inherent to deep learning and other artificial intelligence in which the rationale for a decision may be obscured.

Specifically, the methods and systems perform these independent determinations through a series of machine learning models that generate predictions for the traits corresponding to each data type in parallel. The methods and systems receive data that corresponds to each trait through respective data feeds, in which each data feed corresponds to a different type of data. For example, each model may receive an independent feed of data related to a given data type. Additionally, in order to limit bias, the methods and systems may express the corresponding trait of each data type as a probability.

The methods and systems may then aggregate the probabilities using an oracle layer. The oracle layer may function to generate an output that represents a likely identity (or purpose) of a communication based on both a likely identity and traits of the identity of the user (e.g., based on off-chain data) and current blockchain network conditions (e.g., based on on-chain data). The system may then select a rule set from a plurality of rule sets based on this information. For example, by using and applying rule sets based on the current network conditions, the methods and systems may make predictions for given communications. Moreover, by determining a likely identity as well as current blockchain network conditions using the aforementioned machine learning architecture and then applying a rule set based on this information (e.g., as opposed to a machine learning model that inputs feeds of data related to factors and outputs a prediction of completion for a given communication), the methods and systems prevent bias from entering the prediction.

In some aspects, methods and systems are described for predicting communication account identities across decentralized applications based on aggregating traits of blockchain and off-chain operations using a multi-tiered machine learning architecture. For example, the system may receive a first data feed, wherein the first data feed corresponds to a first type of communication data, wherein the first type of communication data is blockchain data. The system may receive a second data feed, wherein the second data feed corresponds to a second type of communication data, wherein the second type of communication data is off-chain data. The system may receive a first communication. The system may generate a first feature input based on the first data feed. The system may generate a second feature input based on the second data feed. The system may input the first feature input into a first machine learning model to generate a first output, wherein the first machine learning model is trained to predict first communication account identity traits based on historic communication data of the first type, and wherein the first output indicates a first communication account identity trait. The system may input the second feature input into a second machine learning model to generate a second output, wherein the second machine learning model is trained to predict second communication account identity traits based on historic communication data of the second type, and wherein the second output indicates a second communication account identity trait. The system may generate, using an oracle layer for the first machine learning model and the second machine learning model, a third feature input based on the first output and the second output. The system may determine, based on the third feature input, a first rule set from a plurality of rule sets for predicting communication account identities. The system may predict a first communication account identity for the first communication based on the first rule set. The system may generate for display, on a user interface, a recommendation based on the first communication account identity.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
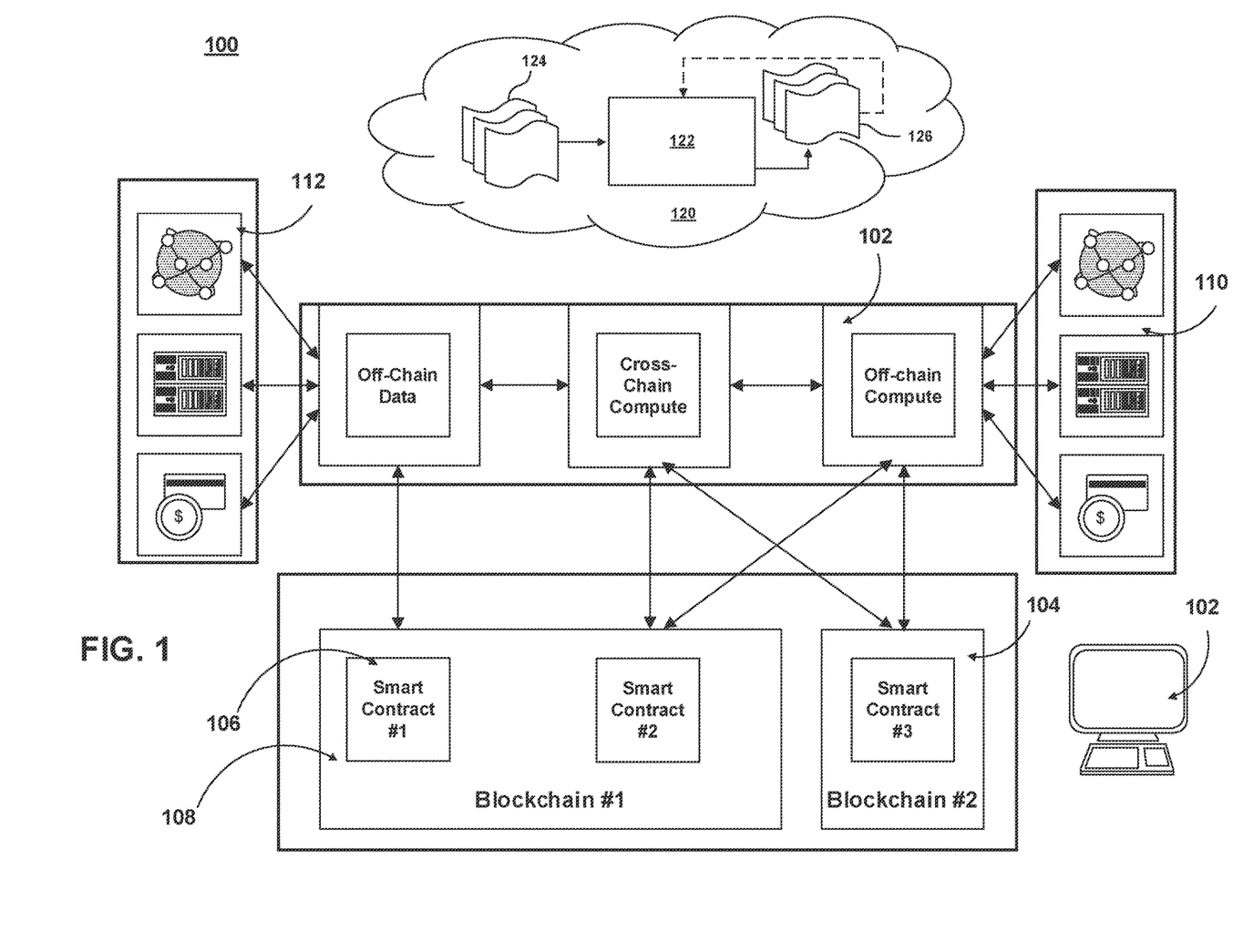
FIG. 1 shows an illustrative diagram of an architecture for predicting communication account identities across decentralized applications, in accordance with one or more embodiments.

FIG. 1 shows an illustrative diagram of an architecture for predicting communication account identities across decentralized applications, in accordance with one or more embodiments. For example, the system may use architecture 100 for predicting communication account identities across decentralized applications based on aggregating traits of blockchain and off-chain operations.

For example, the system may include one or more oracle layers (e.g., oracle layer 102). Oracle layer 102 may comprise a blockchain oracle, which may be an entity or component that connects blockchains to external systems, thereby enabling smart contracts to execute based upon inputs and outputs from the real world. The system may use a plurality of oracles and/or an oracle network in order to prevent a single failure point for architecture 100. For example, a single oracle may go offline (e.g., due to a component failure). As such, smart contracts may not have access to data required for execution or may execute improperly based on stale data. Alternatively or additionally, a single oracle may become corrupted. If so, the data being delivered on-chain may be incorrect and lead to smart contracts executing wrong outcomes.

For example, architecture 100 may include external data sources 110 and 112. In some embodiments, external data sources 110 may include data providers, existing backend systems, and/or payment systems. These external data sources 110 may provide off-chain data to the system for use in predicting communication account identities. For example, an external data source 110 may be a social media network. As used herein, a "social media network" refers to a platform that facilitates networking and/or social relations among people who, for example, share interests, activities, backgrounds, and/or real-life connections. In some cases, social media networks may facilitate communication between multiple user devices (e.g., computers, televisions, smartphones, tablets, etc.) associated with different users by exchanging content from one device to another via a social media server. As used herein, a "social media server" refers to a computer server that facilitates a social media network. For example, a social media server owned/operated/used by a social media provider may make content (e.g., status updates, microblog posts, images, graphic messages, etc.) associated with a first user accessible to a second user that is within the same social media network as the first user.

The system may monitor content from external data sources 110 to generate data for use in determining an identity of a user. For example, the system may receive a data feed, wherein the data feed corresponds to a second type of communication data (e.g., data from a specific source, having a specific characteristic, and/or otherwise distinguishable from other data). As the data originates from external data sources 110, the data may be off-chain data.

The system may also monitor content from one or more blockchains (e.g., blockchain 108 and/or blockchain 104) and/or one or more smart contracts (e.g., smart contract 106) to generate data for use in determining an identity of a user. For example, the system may receive a data feed, wherein the data feed corresponds to a first type of communication data (e.g., data from a specific source, having a specific characteristic, and/or otherwise distinguishable from other data). As the data originates from a blockchain, the data may be on-chain data.

Architecture 100 also includes oracle layer 102. Oracle layer 102 may receive data from external data sources 110 as well as blockchain 104 to predict communication account identities across decentralized applications based on aggregating traits of blockchain and off-chain operations. In some embodiments, oracle layer 102 may comprise several additional components used to process blockchain and off-chain operations. For example, oracle layer 102 may implement and/or have access to one or more machine learning models. For example, oracle layer 102 may comprise a first machine learning model trained to predict communication account identity traits of a first type based on historic communication data of the first type and a second machine learning model trained to predict communication account identity traits of a second type based on historic communication data of the second type. For example, the machine learning models may be trained on respective historic communication data (e.g., previously generated and/or received data of the same or similar type) to identify patterns that may be used to predict communication account identities.

The system may also use varying oracle components and/or architectures to predict communication account identities across decentralized applications. For example, oracle layer 102 may comprise an input oracle, which fetches data from the real world (off-chain) and delivers it onto a blockchain network for smart contract consumption. Oracle layer 102 may also comprise an output oracle, which allows smart contracts to send commands to off-chain systems that trigger them to execute certain actions. Oracle layer 102 may also include a cross-chain oracle that can read and write information between different blockchains. For example, the cross-chain oracle may enable interoperability for moving both data and assets between blockchains, such as using data on one blockchain to trigger an action on another or bridging assets cross-chain so that they can be used outside the native blockchain on which they were issued. Additionally or alternatively, the system may comprise a compute-enabled oracle, which uses secure off-chain computation to provide decentralized services that are impractical to perform on-chain due to technical, legal, or financial constraints. For example, oracle layer 102 may use a compute-enabled oracle component to house machine learning models and/or process feature inputs through machine learning models. The system may also use a compute-enabled oracle component to automate the running of smart contracts when predefined events take place (e.g., based on one or more rule sets), computing zero-knowledge proofs to generate data privacy, and/or running a verifiable randomness function to provide a tamper-proof and provably fair source of randomness to smart contracts.

Oracle layer 102 may implement and/or have access to cloud components 120. Cloud components 120 may also include model 122, which may be a knowledge graph and/or other artificial intelligence model that predicts communication account identities across decentralized applications. Model 122 may take inputs 124 and provide outputs 126. The inputs may include multiple datasets such as a training dataset and a test dataset. Each of the plurality of datasets (e.g., inputs 124) may include data subsets related to hierarchical data structures for the crowdsource database, native data, and contribution characteristics. In some embodiments, outputs 126 may be fed back to model 122 as input to train model 122 (e.g., alone or in conjunction with user indications of the accuracy of outputs 126, labels associated with the inputs, or with other reference feedback information). For example, the system may receive a first labeled feature input, wherein the first labeled feature input is labeled with a known communication account identity trait. As referred to herein, the communication account identity trait may comprise any characteristic used to distinguish one account from another and/or indicate a known persona that corresponds to an account. The system may then train the first machine learning model to classify the inputted communication account identity trait according to known communication account identity traits (e.g., to determine similarities between different traits and/or collections of traits).

In another embodiment, model 122 may update its configurations (e.g., weights, biases, or other parameters) based on the assessment of its prediction (e.g., outputs 126) and reference feedback information (e.g., user indication of accuracy, reference labels, or other information). In another embodiment, where model 122 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 122 may be trained to generate better predictions.

In some embodiments, model 122 may include an artificial neural network. In such embodiments, model 122 may include an input layer and one or more hidden layers. Each neural unit of model 122 may be connected with many other neural units of model 122. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 122 may be self-learning and trained, rather than explicitly programmed, and can perform significantly better in certain areas of problem solving, as compared to traditional computer programs. During training, an output layer of model 122 may correspond to a classification of model 122, and an input known to correspond to that classification may be input into an input layer of model 122 during training. During testing, an input without a known classification may be input into the input layer, and a determined classification may be output (e.g., a communication account identity trait).

The system may determine a first rule set from a plurality of rule sets for predicting communication account identities based on outputs from one or more models. In some embodiments, the system may retrieve a standard rule set. Alternatively, the system may retrieve a custom rule set. For example, the system may select a rule set from a plurality of available rule sets based on the type of data received in a data feed and/or the output of one or more data feeds. As such, the rule set applied for determining the identity (or purpose) of a communication may be different from one in which an ample amount of information is available. As an example, the system may more heavily weigh a user device location, amount of digital assets related to a blockchain operation, and/or age of the blockchain account. The system (and the rule set selected) may contrast this with a scenario in which a new blockchain account is created but there is additional data available (e.g., from a social media provider, back account, etc.). As an example, the system may not heavily weigh a user device location, amount of digital assets related to a blockchain operation, and/or age of the blockchain account. As separate models are used to determine traits based on the respective types of data, the lack of data does not affect an individual determination for a given trait, yet this information is still accounted for in the selection of the rule set used to generate the recommendation. Notably, this segregation of data and determinations also overcomes a technical hurdle inherent to deep learning and other artificial intelligence in which the rationale for a decision may be obscured.

In some embodiments, model 122 may include multiple layers (e.g., where a signal path traverses from front layers to back layers). In some embodiments, backpropagation techniques may be utilized by model 122 where forward stimulation is used to reset weights on the "front" neural units. In some embodiments, stimulation and inhibition for model 122 may be more free-flowing, with connections interacting in a more chaotic and complex fashion. During testing, an output layer of model 122 may indicate whether a given input corresponds to a classification of model 122 (e.g., a known communication account identity trait).

Figure 2:
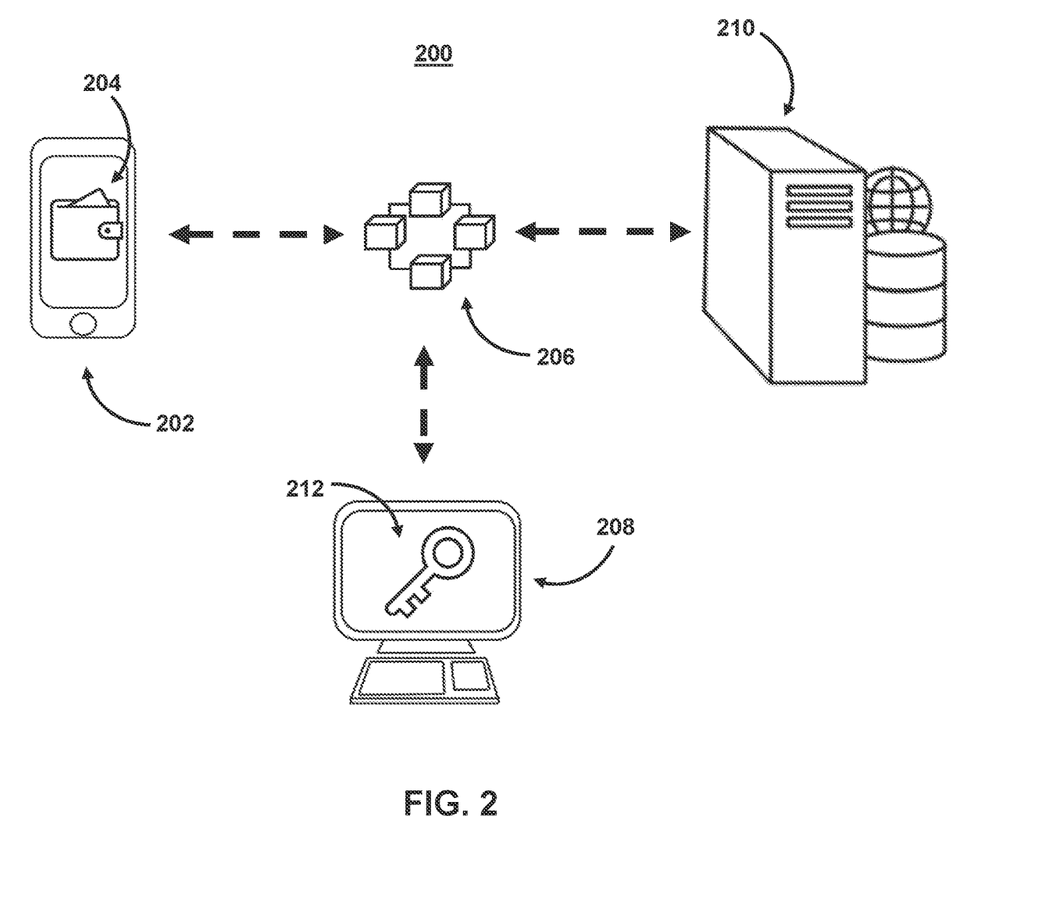
FIG. 2 shows an illustrative diagram for conducting blockchain operations, in accordance with one or more embodiments.

FIG. 2 shows an illustrative diagram for conducting blockchain operations, in accordance with one or more embodiments. For example, the diagram presents various components that may be used to predict communication account identities across decentralized applications in some embodiments. FIG. 2 includes user device 202. User device 202 may include a user interface. As referred to herein, a "user interface" may comprise a mechanism for human-computer interaction and communication in a device and may include display screens, keyboards, a mouse, and the appearance of a desktop. For example, a user interface may comprise a way a user interacts with an application or website in order to predict communication account identities across decentralized applications, and the user interface may display content related to predicting communication account identities across decentralized applications. As referred to herein, "content" should be understood to mean an electronically consumable user asset, representations of goods or services (including nonfungible tokens), internet content (e.g., streaming content, downloadable content, webcasts, etc.), video data, audio data, image data, and/or textual data, etc.

As shown in FIG. 2, system 200 may include multiple user devices (e.g., user device 202, user device 208, and/or user device 210). For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system.

It should be noted that, while shown as a smartphone, a personal computer, and a server in FIG. 2, the user devices may be any type of computing device, including, but not limited to, a laptop computer, a tablet computer, a handheld computer, and/or other computing equipment (e.g., a server), including "smart," wireless, wearable, and/or mobile devices. It should be noted that embodiments describing system 200 performing a blockchain operation may equally be applied to, and correspond to, an individual user device (e.g., user device 202, user device 208, and/or user device 210) performing the blockchain operation. That is, system 200 may correspond to the user devices (e.g., user device 202, user device 208, and/or user device 210) collectively or individually.

Each of the user devices may be used by the system to conduct blockchain operations and/or contribute to predicting communication account identities across decentralized applications. As referred to herein, "blockchain operations" may comprise any operations including and/or related to blockchains and blockchain technology. For example, blockchain operations may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain operation may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain operation may comprise the creation, modification, exchange, and/or review of a token (e.g., a digital asset-specific blockchain), including a nonfungible token. A nonfungible token may comprise a token that is associated with a good, a service, a smart contract, and/or other content that may be verified by, and stored using, blockchain technology.

In some embodiments, blockchain operations may also comprise actions related to mechanisms that facilitate other blockchain operations (e.g., actions related to metering activities for blockchain operations on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain operation (e.g., computation, data access, transaction, etc.). Each blockchain operation has a predetermined cost in units of gas (e.g., as determined based on a predefined set of rules for the system). When a blockchain operation triggers the execution of a smart contract, the blockchain operation may include an amount of gas that sets the upper limit of what can be consumed in running the smart contract. The system may terminate execution of the smart contract if the amount of gas consumed by computation exceeds the gas available in the blockchain operation. For example, in Ethereum, gas comprises a mechanism for allowing Turing-complete computation while limiting the resources that any smart contract and/or blockchain operation may consume.

In some embodiments, gas may be obtained as part of a blockchain operation (e.g., a purchase) using a network-specific cryptocurrency (e.g., ether in the case of Ethereum). The system may require gas (or the amount of the network-specific cryptocurrency corresponding to the required amount of gas) to be transmitted with the blockchain operation as an earmark to the blockchain operation. In some embodiments, gas that is earmarked for a blockchain operation may be refunded back to the originator of the blockchain operation if, after the computation is executed, an amount remains unused.

As shown in FIG. 2, one or more user devices may include a digital wallet (e.g., digital wallet 204) used to perform blockchain operations. For example, the digital wallet may comprise a repository that allows users to store, manage, and trade their cryptocurrencies and assets, interact with blockchains, and/or conduct blockchain operations using one or more applications. The digital wallet may be specific to a given blockchain protocol or may provide access to multiple blockchain protocols. In some embodiments, the system may use various types of wallets such as hot wallets and cold wallets. Hot wallets are connected to the internet while cold wallets are not. Most digital wallet holders hold both a hot wallet and a cold wallet. Hot wallets are most often used to perform blockchain operations, while a cold wallet is generally used for managing a user account and may have no connection to the internet.

As shown in FIG. 2, one or more user devices may include a private key (e.g., key 212) and/or digital signature. For example, system 200 may use cryptographic systems for conducting blockchain operations such as predicting communication account identities across decentralized applications. For example, system 200 may use public-key cryptography, which features a pair of digital keys (e.g., which may comprise strings of data). In such cases, each pair comprises a public key (e.g., which may be public) and a private key (e.g., which may be kept private). System 200 may generate the key pairs using cryptographic algorithms (e.g., featuring one-way functions). System 200 may then encrypt a message (or other blockchain operation) using an intended receiver's public key such that the encrypted message may be decrypted only with the receiver's corresponding private key. In some embodiments, system 200 may combine a message with a private key to create a digital signature on the message. For example, the digital signature may be used to verify the authenticity of blockchain operations. As an illustration, when conducting blockchain operations, system 200 may use the digital signature to prove to every node in the system that it is authorized to conduct the blockchain operations.

For example, system 200 may comprise a plurality of nodes for the blockchain network. Each node may correspond to a user device (e.g., user device 208). A node for a blockchain network may comprise an application or other software that records and/or monitors peer connections to other nodes and/or miners for the blockchain network. For example, a miner comprises a node in a blockchain network that facilitates blockchain operations by verifying blockchain operations on the blockchain, adding new blocks to the existing chain, and/or ensuring that these additions are accurate. The nodes may continually record the state of the blockchain and respond to remote procedure requests for information about the blockchain.

For example, user device 208 may request a blockchain operation (e.g., conduct a transaction). The blockchain operation may be authenticated by user device 208 and/or another node (e.g., a user device in the community network of system 200). For example, using cryptographic keys, system 200 may identify users and give access to their respective user accounts (e.g., corresponding digital wallets) within system 200. Using private keys (e.g., known only to the respective users) and public keys (e.g., known to the community network), system 200 may create digital signatures to authenticate the users.

Following an authentication of the blockchain operation (e.g., using key 212), the blockchain operation may be authorized. For example, after the blockchain operation is authenticated between the users, system 200 may authorize the blockchain operation prior to adding it to the blockchain. System 200 may add the blockchain operation to blockchain 206. System 200 may perform this based on a consensus of the user devices within system 200. For example, system 200 may rely on a majority (or other metric) of the nodes in the community network (e.g., user device 202, user device 208, and/or user device 210) to determine that the blockchain operation is valid. In response to validation of the block, a node user device (e.g., user device 202, user device 208, and/or user device 210) in the community network (e.g., a miner) may receive a reward (e.g., in a given cryptocurrency) as an incentive for validating the block.

To validate the blockchain operation, system 200 may use one or more validation protocols and/or validation mechanisms. For example, system 200 may use a proof-of-work mechanism in which a user device must provide evidence that it performed computational work to validate a blockchain operation and thus this mechanism provides a manner for achieving consensus in a decentralized manner as well as preventing fraudulent validations. For example, the proof-of-work mechanism may involve iterations of a hashing algorithm. The user device that is successful aggregates and records blockchain operations from a mempool (e.g., a collection of all valid blockchain operations waiting to be confirmed by the blockchain network) into the next block. Alternatively or additionally, system 200 may use a proof-of-stake mechanism in which a user account (e.g., corresponding to a node on the blockchain network) is required to have, or "stake," a predetermined amount of tokens in order for system 200 to recognize it as a validator in the blockchain network.

In response to validation of the block, the block is added to blockchain 206, and the blockchain operation is completed. For example, to add the blockchain operation to blockchain 206, the successful node (e.g., the successful miner) encapsulates the blockchain operation in a new block before transmitting the block throughout system 200.

Figure 3:
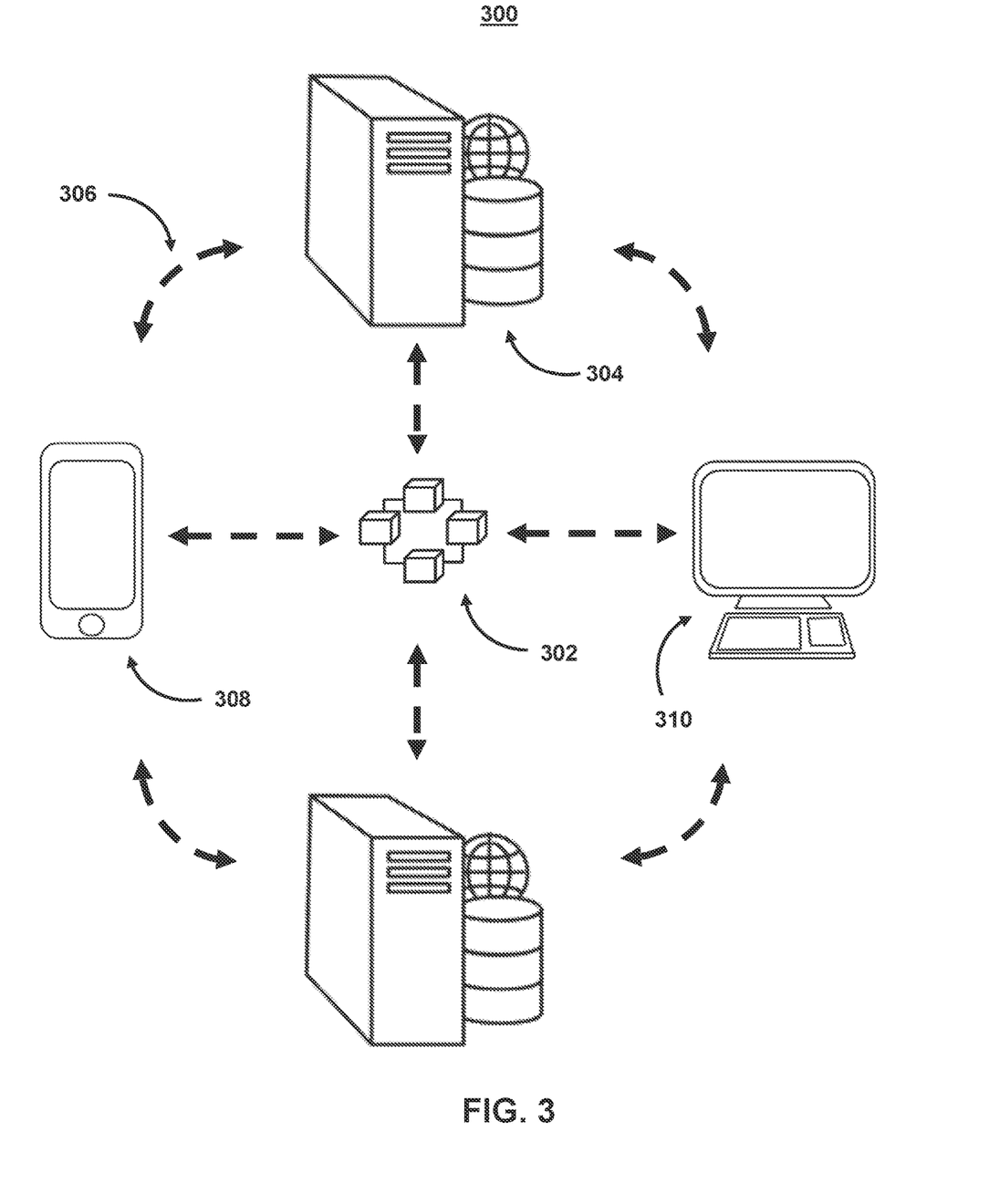
FIG. 3 shows an illustrative diagram for a decentralized application, in accordance with one or more embodiments.

FIG. 3 shows an illustrative diagram for a decentralized application, in accordance with one or more embodiments. For example, in some embodiments, system 300 may predict communication account identities within a decentralized application environment. A decentralized application may comprise an application that exists on a blockchain (e.g., blockchain 302) and/or a peer-to-peer network (e.g., network 306). That is, a decentralized application may comprise an application that has a back end that is in part powered by a decentralized peer-to-peer network such as a decentralized, open-source blockchain with smart contract functionality.

For example, network 306 may allow user devices (e.g., user device 304) within network 306 to share files and access. In particular, the peer-to-peer architecture of network 306 allows blockchain operations (e.g., corresponding to blockchain 302) to be conducted between the user devices in the network, without the need of any intermediaries or central authorities.

In some embodiments, the user devices of system 300 may comprise one or more cloud components. For example, cloud components may be implemented as a cloud computing system and may feature one or more component devices. It should also be noted that system 300 is not limited to four devices. Users may, for instance, utilize one or more devices to interact with one another, one or more servers, or other components of system 300. It should be further noted that while one or more operations (e.g., blockchain operations) are described herein as being performed by a particular component (e.g., user device 304) of system 300, those operations may, in some embodiments, be performed by other components of system 300. As an example, while one or more operations are described herein as being performed by components of user device 304, those operations may, in some embodiments, be performed by one or more cloud components. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components (e.g., user device 304 and user device 308, respectively). Additionally, or alternatively, a single user (and/or a user account linked to a single user) may interact with system 300 and/or one or more components of system 300 using two different components (e.g., user device 304 and user device 308, respectively).

With respect to the components of system 300, each of these devices may receive content and data via input/output (hereinafter "I/O") paths using I/O circuitry. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both user device 308 and user device 310 include a display upon which to display data (e.g., content related to one or more blockchain operations).

Additionally, the devices in system 300 may run an application (or another suitable program). The application may cause the processors and/or control circuitry to perform operations related to predicting communication account identities within a decentralized application environment.

Each of these devices may also include electronic storages. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes network 306, which may comprise communication paths between user devices. The communication paths may include the internet, a mobile phone network, a mobile voice or data network (e.g., a 5G or LTE network), a cable network, a public switched telephone network, or other types of communication networks or combinations of communication networks. The communication paths may separately or together include one or more communication paths, such as a satellite path, a fiber-optic path, a cable path, a path that supports internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Figure 4:
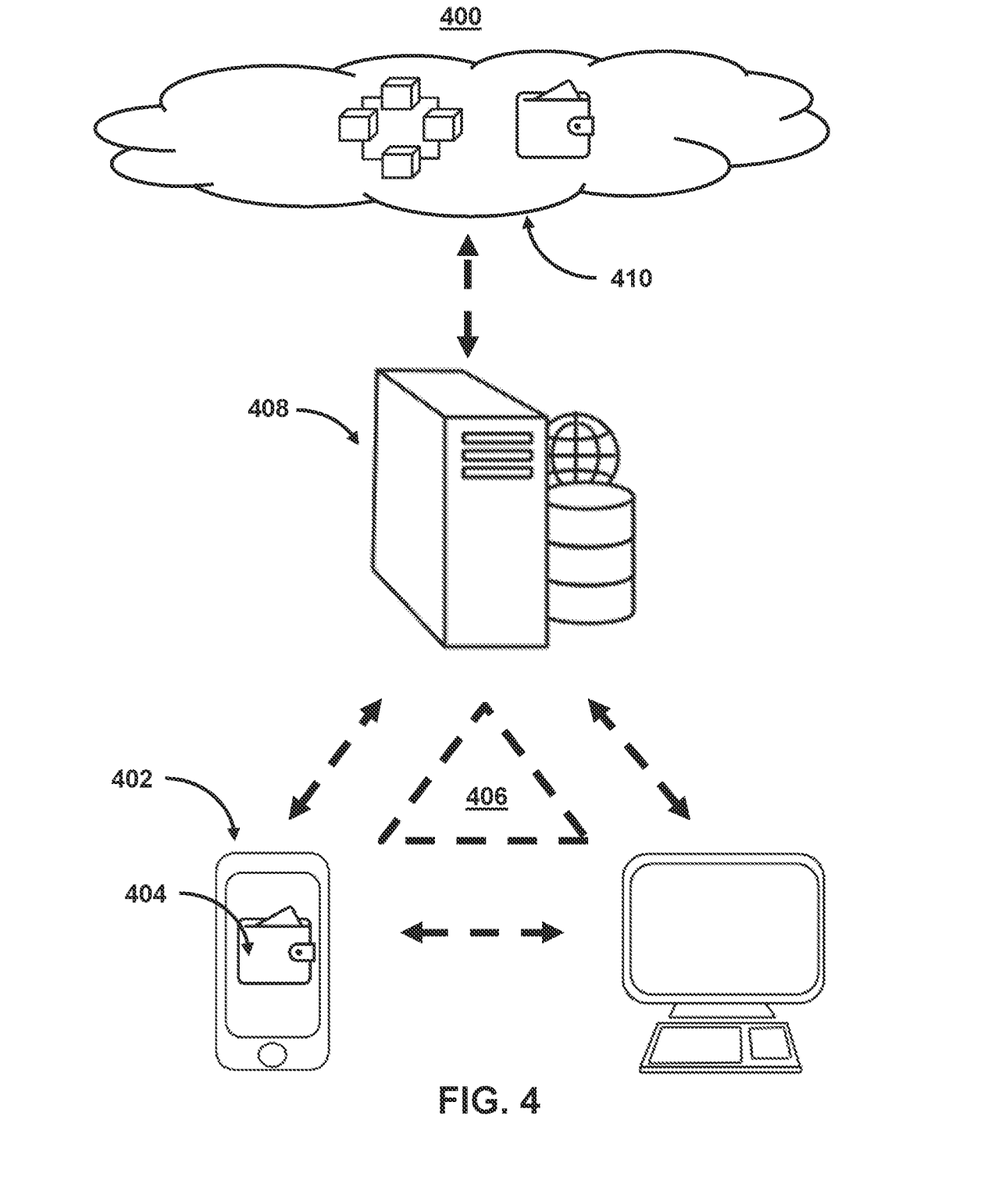
FIG. 4 shows an illustrative diagram for conducting operations in a decentralized application using blockchain operations, in accordance with one or more embodiments.

FIG. 4 shows an illustrative diagram for conducting operations in a decentralized application using blockchain operations, in accordance with one or more embodiments. For example, system 400 may include user device 402. Furthermore, user device 402 may comprise an application (e.g., application 404) that is implemented on, and/or accessible by, user device 402. For example, application 404 may interact with one or more other applications and/or application programming interfaces (APIs) in order to predict communication account identities across decentralized applications. For example, application 404 may comprise a decentralized application digital wallet and/or wallet service that is able to sign and send transactions to transfer tokens and/or perform other blockchain operations as well as interact with one or more decentralized applications.

System 400 also includes API layer 406. In some embodiments, API layer 406 may be implemented on user device 402. Alternatively or additionally, API layer 406 may reside on one or more cloud components (e.g., server 408). For example, API layer 406 may reside on a server and comprise a platform service for a custodial wallet service, decentralized application, etc. API layer 406 (which may be a REST or web services API layer) may provide a decoupled interface to data and/or functionality of one or more applications.

API layer 406 may provide various low-level and/or blockchain-specific operations in order to facilitate predicting communication account identities across decentralized applications. For example, API layer 406 may provide blockchain operations such as blockchain writes. Furthermore, API layer 406 may perform a transfer validation ahead of forwarding the blockchain operation (e.g., a transaction) to another service (e.g., a crypto service). API layer 406 may then log the outcome. For example, by logging to the blockchain prior to forwarding, the API layer may maintain internal records and balances without relying on external verification (e.g., which may take up to ten minutes depending on blockchain updating activity).

API layer 406 may also provide informational reads. For example, API layer 406 (or a platform service powered by API layer 406) may generate blockchain operation logs and write to an additional ledger (e.g., an internal record and/or indexer service) the outcome of the reads. If this is done, a user accessing the information through other means may see consistent information such that downstream users ingest the same data point as the user.

API layer 406 may also provide a unified API to access balances, transaction histories, and/or other blockchain operations activity records between one or more decentralized applications and custodial user accounts. By doing so, the system maintains the security of sensitive information such as the balances and transaction history. Alternatively, a mechanism for maintaining such security would separate the API access between the decentralized applications and custodial user accounts through the use of special logic. The introduction of the special logic decreases the streamlining of the system, which may result in system errors based on divergence and reconciliation.

API layer 406 may provide a common, language-agnostic way of interacting with an application. In some embodiments, API layer 406 may comprise a web services API that offers a well-defined contract that describes the services in terms of their operations and the data types used to exchange information. REST APIs do not typically have this contract; instead, they are documented with client libraries for most common languages including Ruby, Java, PHP, and JavaScript. SOAP web services have traditionally been adopted in the enterprise for publishing internal services as well as for exchanging information with partners in business-to-business (B2B) transactions.

API layer 406 may use various architectural arrangements. For example, system 400 may be partially based on API layer 406, such that there is strong adoption of SOAP and RESTful web services, using resources such as Service Repository and Developer Portal, but with low governance, standardization, and separation of concerns. Alternatively, system 400 may be fully based on API layer 406, such that separation of concerns between layers such as API layer 406, services, and applications are in place.

In some embodiments, the system architecture may use a microservice approach. Such systems may use two types of layers: front-end layers and back-end layers, where microservices reside. In this kind of architecture, the role of the API layer 406 may be to provide integration between front-end and back-end layers. In such cases, API layer 406 may use RESTful APIs (exposition to front-end or even communication between microservices). API layer 406 may use the Advanced Message Queuing Protocol (AMQP), which is an open standard for passing business messages between applications or organizations. API layer 406 may use an open-source, high-performance remote procedure call (RPC) framework that may run in a decentralized application environment. In some embodiments, the system architecture may use an open API approach. In such cases, API layer 406 may use commercial or open-source API platforms and their modules. API layer 406 may use a developer portal. API layer 406 may use strong security constraints applying a web application firewall that protects the decentralized applications and/or API layer against common web exploits, bots, and distributed denial-of-service (DDoS) attacks. API layer 406 may use RESTful APIs as standard for external integration.

As shown in FIG. 4, system 400 may use API layer 406 to communicate with and/or facilitate blockchain operations with server 408. For example, server 408 may represent a custodial platform for blockchain operations. A custodial platform may manage private keys stored by a centralized service provider (e.g., server 408). In such cases, server 408 may interact with blockchain 410, a wallet service for blockchain 410, an indexer service for blockchain 410 (e.g., as described in FIG. 5), and/or other platform services.

For example, a wallet service may comprise an application and/or a software-based system that securely stores users' payment information, private keys, and/or passwords facilitating blockchain operations with websites, nodes, and/or other devices. In some embodiments, a wallet service may also provide additional ledger access (e.g., to a second ledger). Furthermore, as discussed above, this second ledger may receive updates directly from API layer 406, as opposed to relying on data pulled directly from blockchain 410.

For example, system 400 may maintain its records (e.g., both live and for accounting) in good order separate from balances on blockchain 410. That is, system 400 may maintain an architecture featuring the second ledger, where balances are stored and updated, and the logs of blockchain operations. While conventional systems may rely on directly referencing blockchain 410, since the blockchain is the source of truth for the system, however, such reliance leads to additional technical problems.

First, there is a strong likelihood of impedance mismatch between a format for a platform service and the APIs used to retrieve data from the blockchain (e.g., which may lead to accounting imbalances). For example, system 400 may need to be able to generate accounting entries reflecting changes of balances. However, while changes of balances can be tracked by examining blockchain 410, this requires additional processing and computational power.

Second, accounting changes in a blockchain architecture should be irreversible. This is achieved in practice for current blockchain operations by waiting for a variable number of confirmations from the blockchain (e.g., blockchain 410). By waiting for the variable number of confirmations, the likelihood of an error in the blockchain becomes infinitesimally small. However, while blockchain services rely on this methodology, this is not a rule inherent to the blockchain itself. That is, the blockchain does not have an inherent authentication mechanism that is dependent on a number of confirmations. Instead, the blockchain relies on an absolute system-blockchain operations are either recorded on a particular node or they are not.

As such, forks in the blockchain are always possible. In the case of a fork, system 400 may not follow the "right" fork for an undetermined amount of time. If that happens, and if, for the purpose of a custodial digital wallet, system 400 decides to move from one fork to another, system may have a more straightforward mechanism to maintain an accurate history of a user account's positions if system 400 stores them independently from a given blockchain. Furthermore, in the case of forks, system 400 performs some internal remediation on user accounts, which is enabled by system 400 maintaining a layer of insulation, from the blockchain, for remedial blockchain operations. For example, system 400 may have separate storage, protected by the second ledger (e.g., a ledger service), for reads, and by a transfer service, for writes, that reflects the state of the blockchain that is relevant for system 400 purposes.

In some embodiments, the system may also use one or more Application Binary Interfaces (ABIs). An ABI is an interface between two program modules, often between operating systems and user programs. ABIs may be specific to a blockchain protocol. For example, an Ethereum Virtual Machine (EVM) is a core component of the Ethereum network, and a smart contract may be a piece of code stored on the Ethereum blockchain which is executed on the EVM. Smart contracts written in high-level languages like Solidity or Vyper may be compiled in EVM-executable bytecode by the system. Upon deployment of the smart contract, the bytecode is stored on the blockchain and is associated with an address. To access functions defined in high-level languages, the system translates names and arguments into byte representations for byte code to work with it. To interpret the bytes sent in response, the system converts back to the tuple (e.g., a finite ordered list of elements) of return values defined in higher-level languages. Languages that compile for the EVM maintain strict conventions about these conversions, but in order to perform them, the system must maintain the precise names and types associated with the operations. The ABI documents these names and types precisely, and in an easily parseable format, performing translations between human-intended method calls and smart-contract operations in a manner that is both discoverable and reliable.

For example, ABI defines the methods and structures used to interact with the binary contract similar to an API, but on a lower level. The ABI indicates the caller of the function to encode (e.g., ABI encoding) the needed information like function signatures and variable declarations in a format that the EVM can understand to call that function in bytecode. ABI encoding may be automated by the system using compilers or wallets interacting with the blockchain.

Figure 5:
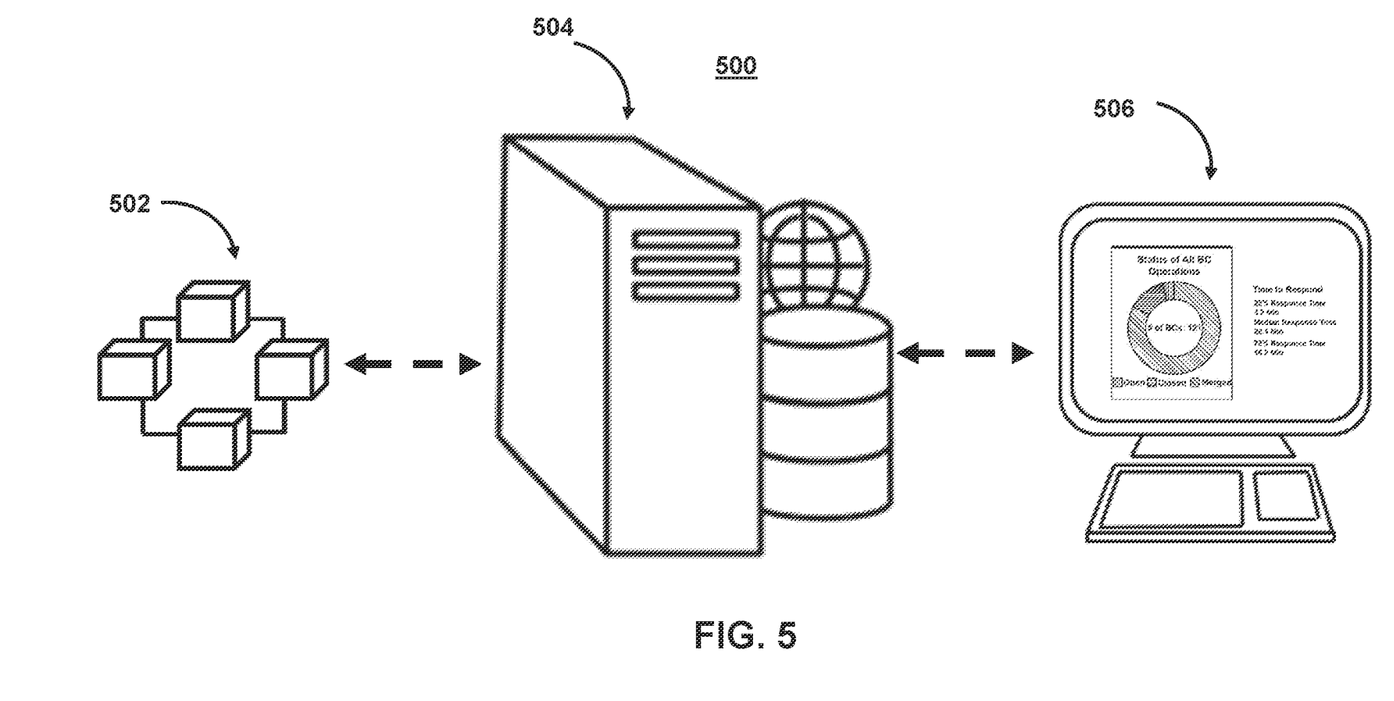
FIG. 5 shows an illustrative diagram for a blockchain indexer, in accordance with one or more embodiments.

FIG. 5 shows an illustrative diagram for a blockchain indexer, in accordance with one or more embodiments. For example, in some embodiments, the system may use indexer service 500 for predicting communication account identities across decentralized applications. Indexer service 500 may fetch raw data (e.g., data related to a current state and/or instance of blockchain 502) from a node of a blockchain network (e.g., as described above). Indexer service 500 may then process the data and store it in a database and/or data structure in an efficient way to provide quick access to the data. For example, indexer 504 may publish and/or record a subset of blockchain operations that occur for blockchain 502. Accordingly, for subsequent blockchain operations, indexer service 500 may reference the index at indexer 504 as opposed to a node of blockchain 502 to provide various services at user device 506.

For example, indexer 504 may store a predetermined list of blockchain operations to monitor for and/or record in an index. These may include blockchain operations (e.g., "operation included," "operation removed," "operation finalized") related to a given type of blockchain operation (e.g., "transaction," "external transfer," "internal transfer," "new contract metadata," "ownership change," etc.) as well as blockchain operations related to a given protocol, protocol subgroup, and/or other characteristic (e.g., "ETH," "ERC20," and/or "ERC721"). Additionally or alternatively, the various blockchain operations and metadata related to those blockchain operations (e.g., block designations, user accounts, time stamps, etc.) as well as an aggregate of multiple blockchain operations (e.g., total blockchain operations amounts, rates of blockchain operations, rate of blockchain updates, etc.) may be monitored and/or recorded.

Indexer 504 may likewise provide navigation and search features (e.g., support Boolean operations) for the indexed blockchain operations. In some embodiments, indexer 504 may apply one or more formatting protocols to generate representations of indexed blockchain operations in a human-readable format. In some embodiments, indexer 504 may also tag blockchain operations based on whether the blockchain operation originated for a local user account (e.g., a user account corresponding to a custodial account) and/or a locally hosted digital wallet. Indexer service 500 may determine whether a blockchain operation contains relevant information for users of indexer service 500 by storing information about whether an address is an internal address of indexer service 500 or one used in a digital wallet hosted by a predetermined wallet service.

Figure 6:
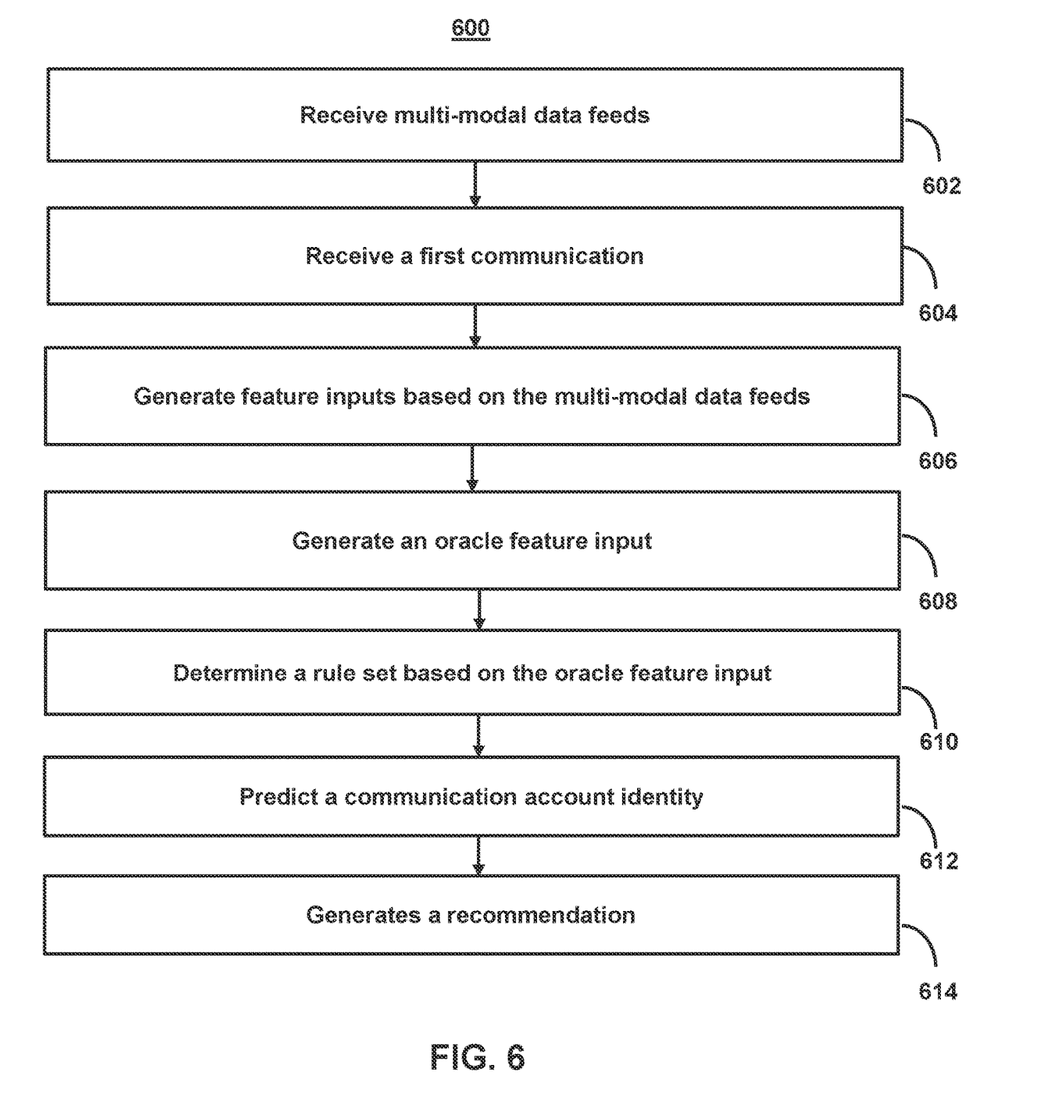
FIG. 6 shows a flowchart of the steps involved in predicting communication account identities across decentralized applications based on aggregating traits of blockchain and off-chain operations using a multi-tiered machine learning architecture, in accordance with one or more embodiments.

FIG. 6 shows a flowchart of the steps for predicting communication account identities across decentralized applications based on aggregating traits of blockchain and off-chain operations through the use of a multi-tiered machine learning architecture. For example, process may comprise one or more steps for generation recommendation and/or predictions for communication account identities.

At step 602, process 600 (e.g., using one or more components described above) receives multi-modal data feeds. For example, the system may receive a first data feed, wherein the first data feed corresponds to a first type of communication data (e.g., blockchain data). The system may also receive a second data feed, wherein the second data feed corresponds to a second type of communication data (e.g., off-chain data).

In some embodiments, receiving the first data feed and the second data feed may further comprise receiving a multi-modal data feed, wherein the multi-modal data feed corresponds to a plurality of types of communication data. The system may then segregate the multi-modal data feed into the first data feed and the second data feed. For example, the multi-modal data feed may comprise real-time data received from a plurality of sources. For example, the system may receive communication data, which may include data about one or more on-chain or off-chain operations. In some embodiments, the one or more on-chain or off-chain operations may comprise information that may be used by the system to identify a user corresponding to a communication (e.g., user accounts that are creating, settling, engaging in, and/or facilitating blockchain operations). For example, the system may be used to verify an identity of an entity that is sending payments across countries and/or performing other blockchain operations.

At step 604, process 600 (e.g., using one or more components described above) receives a first communication. For example, the system may receive a first communication. In some embodiments, the system may receive multiple communications. For example, the system may receive a second communication. The system may then predict a second communication account identity for the second communication based on the first rule set, wherein the recommendation is further based on the second communication account identity.

At step 606, process 600 (e.g., using one or more components described above) generates feature inputs. For example, the system may generate a first feature input based on the first data feed. The system may also generate a second feature input based on the second data feed. For example, the system may receive data on a current blockchain state and/or user devices used to perform a blockchain operation. The system may then determine a feature input (e.g., a vector of values representing the particular condition).

For example, the system may input the first feature input into a first machine learning model to generate a first output, wherein the first machine learning model is trained to predict first communication account identity traits based on historic communication data of the first type, and wherein the first output indicates a first communication account identity trait. The system may also input the second feature input into a second machine learning model to generate a second output, wherein the second machine learning model is trained to predict second communication account identity traits based on historic communication data of the second type, and wherein the second output indicates a second communication account identity trait. For example, the first output may indicate the first communication account identity trait as a series of probabilities corresponding to respective values for the first data feed.

At step 608, process 600 (e.g., using one or more components described above) generates an oracle feature input based on the first and second outputs. For example, the system may generate, using an oracle layer for the first machine learning model and the second machine learning model, a third feature input based on the first output and the second output. For example, the system may process the first feature input through the first machine learning model in parallel with processing the second feature input through the second machine learning model. The system may then use the results of this parallel processing as inputs for the oracle layer.

At step 610, process 600 (e.g., using one or more components described above) determines a rule set based on the oracle feature input. For example, the system may determine, based on the oracle feature input, a first rule set from a plurality of rule sets for predicting communication account identities.

At step 612, process 600 (e.g., using one or more components described above) predicts a communication account identity. For example, the system may predict a first communication account identity for the first communication based on the first rule set. In some embodiments, predicting the first communication account identity for the first communication based on the first rule set may further comprise determining a first trait of the first communication and applying the first rule set to the first trait. For example, the first trait may correspond to whether the first communication (e.g., a first blockchain operation) is dependent on a second communication (e.g., a second blockchain operation).

At step 614, process 600 (e.g., using one or more components described above) generates for display a recommendation. For example, the system may generate for display, on a user interface, a recommendation based on the first communication account identity.

In some embodiments, the system may determine an identity probability (e.g., indicating a potential relationship to a known user account) at a first time based on the first communication account identity. The system may then compare the identity probability at the first time to a threshold identity probability. The system may then determine the recommendation based on comparing the identity probability at the first time to a threshold identity probability.

In some embodiments, the system may determine an identity probability at a first time (e.g., based on a current state of a blockchain and/or other current off-chain data) based on the first communication account identity. The system may then determine an off-chain operation required for the first communication based on the identity probability. The system may then determine the recommendation based on the off-chain operation required for the first communication.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the steps, devices, or equipment discussed in relation to FIGS. 1-5 could be used to perform one or more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving a first data feed, wherein the first data feed corresponds to a first type of communication data, wherein the first type of communication data is blockchain data; receiving a second data feed, wherein the second data feed corresponds to a second type of communication data, wherein the second type of communication data is off-chain data; receiving a first communication; generating a first feature input based on the first data feed; generating a second feature input based on the second data feed; inputting the first feature input into a first machine learning model to generate a first output, wherein the first machine learning model is trained to predict first communication account identity traits based on historic communication data of the first type, and wherein the first output indicates a first communication account identity trait; inputting the second feature input into a second machine learning model to generate a second output, wherein the second machine learning model is trained to predict second communication account identity traits based on historic communication data of the second type, and wherein the second output indicates a second communication account identity trait; generating, using an oracle layer for the first machine learning model and the second machine learning model, a third feature input based on the first output and the second output; determining, based on the third feature input, a first rule set from a plurality of rule sets for predicting communication account identities; predicting a first communication account identity for the first communication based on the first rule set; and generating for display, on a user interface, a recommendation based on the first communication account identity.
2. The method of the preceding embodiments, wherein the method is for predicting communication account identities across decentralized applications based on aggregating traits of blockchain and off-chain operations using a multi-tiered machine learning architecture.
3. The method of any one of the preceding embodiments, wherein receiving the first data feed and the second data feed further comprises: receiving a multi-modal data feed, wherein the multi-modal data feed corresponds to a plurality of types of communication data; and segregating the multi-modal data feed into the first data feed and the second data feed.
4. The method of any one of the preceding embodiments, wherein the multi-modal data feed comprises real-time data received from a plurality of sources.
5. The method of any one of the preceding embodiments, further comprising: receiving a second communication; and predicting a second communication account identity for the second communication based on the first rule set, wherein the recommendation is further based on the second communication account identity.
6. The method of any one of the preceding embodiments, further comprising: determining an identity probability at a first time based on the first communication account identity; comparing the identity probability at the first time to a threshold identity probability; and determining the recommendation based on comparing the identity probability at the first time to a threshold identity probability.
7. The method of any one of the preceding embodiments, further comprising: determining an identity probability at a first time based on the first communication account identity; determining an off-chain operation required for the first communication based on the identity probability; and determining the recommendation based on the off-chain operation required for the first communication.
8. The method of any one of the preceding embodiments, wherein the first output indicates the first communication account identity trait as a series of probabilities corresponding to respective values for the first data feed.
9. The method of any one of the preceding embodiments, further comprising processing the first feature input through the first machine learning model in parallel with processing the second feature input through the second machine learning model.
10. The method of any one of the preceding embodiments, wherein predicting the first communication account identity for the first communication based on the first rule set further comprises: determining a first trait of the first communication; and applying the first rule set to the first trait.
11. The method of any one of the preceding embodiments, wherein the first trait corresponds to whether the first communication is dependent on a second communication.
12. A tangible, non-transitory machine-readable medium storing instructions that, when executed by a data processing apparatus, cause the data processing apparatus to perform operations comprising those of any of embodiments 1-11.
13. A system comprising one or more processors; and memory storing instructions that, when executed by the processors, cause the processors to effectuate operations comprising those of any of embodiments 1-11.
14. A system comprising means for performing any of embodiments 1-11.

What is claimed is:

1. A system for predicting communication account identities across decentralized applications based on aggregating traits of blockchain and off-chain operations using a multi-tiered machine learning architecture, the system comprising:
cloud-based storage circuitry configured to:
store a first tier of a machine learning architecture, wherein the first tier comprises:

a first machine learning model trained to predict communication account identity traits of a first type based on historic communication data of the first type;
a second machine learning model trained to predict communication account identity traits of a second type based on historic communication data of the second type; and
an oracle layer for the first machine learning model and the second machine learning model;
store a second tier of the machine learning architecture, wherein the second tier comprises a plurality of rule sets for predicting communication account identities;
cloud-based control circuitry configured to:
receive a first data feed, wherein the first data feed corresponds to a first type of communication data, wherein the first type of communication data is on-chain data, and wherein the first type of communication data indicates a blockchain network volume of pending communications;
receive a second data feed, wherein the second data feed corresponds to a second type of communication data, and wherein the second type of communication data indicates communication formats of pending communications;
generate a first feature input based on the first data feed;
generate a second feature input based on the second data feed;
input the first feature input into the first machine learning model to generate a first output, wherein the first output indicates a first communication account identity trait;
input the second feature input into the second machine learning model to generate a second output, wherein the second output indicates a second communication account identity trait;
generate, using the oracle layer for the first machine learning model and the second machine learning model, a third feature input based on the first output and the second output;
determine, based on the third feature input, a first rule set from a plurality of rule sets for predicting communication account identities;
receive a first communication;
predict a first communication account identity for the first communication based on the first rule set;
determine an identity probability at a first time based on the first communication account identity;
determine an off-chain operation required for the first communication based on the identity probability; and
determine a recommendation based on the off-chain operation required for the first communication; and
cloud-based input/output circuitry configured to generate for display, on a user interface, the recommendation based on the first communication account identity.

2. A method for predicting communication account identities across decentralized applications based on aggregating traits of blockchain and off-chain operations using a multi-tiered machine learning architecture, the method comprising:
receiving a first data feed, wherein the first data feed corresponds to a first type of communication data, wherein the first type of communication data is blockchain data;
receiving a second data feed, wherein the second data feed corresponds to a second type of communication data, wherein the second type of communication data is off-chain data;
receiving a first communication;
generating a first feature input based on the first data feed;
generating a second feature input based on the second data feed;
inputting the first feature input into a first machine learning model to generate a first output, wherein the first machine learning model is trained to predict first communication account identity traits based on historic communication data of the first type, and wherein the first output indicates a first communication account identity trait;
inputting the second feature input into a second machine learning model to generate a second output, wherein the second machine learning model is trained to predict second communication account identity traits based on historic communication data of the second type, and wherein the second output indicates a second communication account identity trait;
generating, using an oracle layer for the first machine learning model and the second machine learning model, a third feature input based on the first output and the second output;
determining, based on the third feature input, a first rule set from a plurality of rule sets for predicting communication account identities;
predicting a first communication account identity for the first communication based on the first rule set; and
generating for display, on a user interface, a recommendation based on the first communication account identity.

3. The method of claim 2, wherein receiving the first data feed and the second data feed further comprises:
receiving a multi-modal data feed, wherein the multi-modal data feed corresponds to a plurality of types of communication data; and
segregating the multi-modal data feed into the first data feed and the second data feed.

4. The method of claim 3, wherein the multi-modal data feed comprises real-time data received from a plurality of sources.

5. The method of claim 2, further comprising:
receiving a second communication; and
predicting a second communication account identity for the second communication based on the first rule set, wherein the recommendation is further based on the second communication account identity.

6. The method of claim 2, further comprising:
determining an identity probability at a first time based on the first communication account identity;
comparing the identity probability at the first time to a threshold identity probability; and
determining the recommendation based on comparing the identity probability at the first time to the threshold identity probability.

7. The method of claim 2, further comprising:
determining an identity probability at a first time based on the first communication account identity;
determining an off-chain operation required for the first communication based on the identity probability; and
determining the recommendation based on the off-chain operation required for the first communication.

8. The method of claim 2, wherein the first output indicates the first communication account identity trait as a series of probabilities corresponding to respective values for the first data feed.

9. The method of claim 2, further comprising processing the first feature input through the first machine learning model in parallel with processing the second feature input through the second machine learning model.

10. The method of claim 2, wherein predicting the first communication account identity for the first communication based on the first rule set further comprises:
   determining a first trait of the first communication; and
   applying the first rule set to the first trait.

11. The method of claim 10, wherein the first trait corresponds to whether the first communication is dependent on a second communication.

12. A non-transitory computer-readable medium comprising instructions that when executed by one or more processors cause operations comprising:
   receiving a first data feed, wherein the first data feed corresponds to a first type of communication data, wherein the first type of communication data is blockchain data;
   receiving a second data feed, wherein the second data feed corresponds to a second type of communication data, wherein the second type of communication data is off-chain data;
   receiving a first communication;
   generating a first feature input based on the first data feed;
   generating a second feature input based on the second data feed;
   inputting the first feature input into a first machine learning model to generate a first output, wherein the first machine learning model is trained to predict first communication account identity traits based on historic communication data of the first type, and wherein the first output indicates a first communication account identity trait;
   inputting the second feature input into a second machine learning model to generate a second output, wherein the second machine learning model is trained to predict second communication account identity traits based on historic communication data of the second type, and wherein the second output indicates a second communication account identity trait;
   generating, using an oracle layer for the first machine learning model and the second machine learning model, a third feature input based on the first output and the second output;
   determining, based on the third feature input, a first rule set from a plurality of rule sets for predicting communication account identities;
   predicting a first communication account identity for the first communication based on the first rule set; and
   generating for display, on a user interface, a recommendation based on the first communication account identity.

13. The non-transitory computer-readable medium of claim 12, wherein receiving the first data feed and the second data feed further comprises:
   receiving a multi-modal data feed, wherein the multi-modal data feed corresponds to a plurality of types of communication data; and
   segregating the multi-modal data feed into the first data feed and the second data feed.

14. The non-transitory computer-readable medium of claim 13, wherein the multi-modal data feed comprises real-time data received from a plurality of sources.

15. The non-transitory computer-readable medium of claim 12, wherein the instructions further cause operations comprising:
   receiving a second communication; and
   predicting a second communication account identity for the second communication based on the first rule set, wherein the recommendation is further based on the second communication account identity.

16. The non-transitory computer-readable medium of claim 12, wherein the instructions further cause operations comprising:
   determining an identity probability at a first time based on the first communication account identity;
   comparing the identity probability at the first time to a threshold identity probability; and
   determining the recommendation based on comparing the identity probability at the first time to the threshold identity probability.

17. The non-transitory computer-readable medium of claim 12, wherein the instructions further cause operations comprising:
   determining an identity probability at a first time based on the first communication account identity;
   determining an off-chain operation required for the first communication based on the identity probability; and
   determining the recommendation based on the off-chain operation required for the first communication.

18. The non-transitory computer-readable medium of claim 12, wherein the first output indicates the first communication account identity trait as a series of probabilities corresponding to respective values for the first data feed.

19. The non-transitory computer-readable medium of claim 12, wherein the instructions further cause operations comprising processing the first feature input through the first machine learning model in parallel with processing the second feature input through the second machine learning model.

20. The non-transitory computer-readable medium of claim 12, wherein predicting the first communication account identity for the first communication based on the first rule set further comprises:
   determining a first trait of the first communication, wherein the first trait corresponds to whether the first communication is dependent on a second communication, and
   applying the first rule set to the first trait.

* * * * *